US012023912B2

(12) United States Patent
Matsushima

(10) Patent No.: US 12,023,912 B2
(45) Date of Patent: Jul. 2, 2024

(54) COATER AND LIQUID DISCHARGE APPARATUS

(71) Applicant: Isao Matsushima, Ibaraki (JP)

(72) Inventor: Isao Matsushima, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 437 days.

(21) Appl. No.: 16/684,863

(22) Filed: Nov. 15, 2019

(65) Prior Publication Data

US 2020/0230977 A1 Jul. 23, 2020

(30) Foreign Application Priority Data

Jan. 18, 2019 (JP) ................................ 2019-006899

(51) Int. Cl.
*B41J 11/057* (2006.01)
*B41J 2/01* (2006.01)
*B65H 5/06* (2006.01)
*B65H 27/00* (2006.01)

(52) U.S. Cl.
CPC ............... *B41J 11/057* (2013.01); *B41J 2/01* (2013.01); *B65H 5/062* (2013.01); *B65H 27/00* (2013.01); *B41J 2002/012* (2013.01)

(58) Field of Classification Search
CPC ...................................................... B65H 5/062
USPC .......................................................... 400/637
See application file for complete search history.

(56) References Cited

U.S. PATENT DOCUMENTS 2,555,319 A * 6/1951 Cross ..................... B41N 10/04 101/420
5,088,404 A * 2/1992 MacConnell ........... B41F 22/00 101/232
6,077,207 A * 6/2000 Yokoyama ............. B65H 27/00 492/18
8,647,475 B2 * 2/2014 Turunen ................. D21H 23/58 162/358.1
2009/0245892 A1 * 10/2009 Obara ................ G03G 15/0808 399/286
2011/0254218 A1 * 10/2011 Maeno ................... B65H 9/006 271/273
2015/0336404 A1 * 11/2015 Sasaki .................. B41J 11/0024 347/101
2017/0120632 A1 * 5/2017 Nakahata ............... B65H 9/006
(Continued)

FOREIGN PATENT DOCUMENTS

CN 107082221 A * 8/2017
JP 2000-334877 A 12/2000
JP 2001-259501 A 9/2001
(Continued)

OTHER PUBLICATIONS

English translation of Oshiba (Year: 2017).*
(Continued)

*Primary Examiner* — Matthew G Marini
(74) *Attorney, Agent, or Firm* — Harness, Dickey & Pierce, P.L.C.

(57) ABSTRACT

A coater includes a coating device and a rotator. The coating device is configured to apply a coating liquid on a sheet material. The rotator is configured to contact a coated surface of the sheet material to which the coating liquid is applied in the coating device. The rotator has a plurality of fine particles on a circumferential surface of the rotator.

15 Claims, 12 Drawing Sheets

(56) References Cited

U.S. PATENT DOCUMENTS

| | | | |
|---|---|---|---|
| 2017/0210578 | A1 | 7/2017 | Nakada et al. |
| 2017/0210579 | A1 | 7/2017 | Watanabe et al. |

FOREIGN PATENT DOCUMENTS

| | | | | | |
|---|---|---|---|---|---|
| JP | 2010-184480 | | | 8/2010 | |
| JP | 2012-071562 | | | 4/2012 | |
| JP | 2012-153504 | A | | 8/2012 | |
| JP | 2012153504 | A | * | 8/2012 | |
| JP | 2012-218902 | | | 11/2012 | |
| JP | 2014091235 | A | * | 5/2014 | |
| JP | 2014-125324 | | | 7/2014 | |
| JP | 2014-125325 | | | 7/2014 | |
| JP | 2016-087895 | | | 5/2016 | |
| JP | 2017023973 | A | * | 2/2017 | |
| JP | 2017-222078 | A | | 12/2017 | |
| WO | WO2014/068108 | A1 | | 5/2014 | |
| WO | WO-2017013983 | A1 | * | 1/2017 | ............... B05D 1/26 |

OTHER PUBLICATIONS

Translation Fukaya (JP 2014091235A) (Year: 2014).*
Office Action for corresponding Japanese Patent Application No. 2019-006899 dated Aug. 23, 2022.

* cited by examiner

COATER AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2019-006899, filed on Jan. 18, 2019, in the Japan Patent Office, the entire disclosure of which is hereby incorporated by reference herein.

BACKGROUND

Technical Field

The present disclosure relates to a coater and a liquid discharge apparatus.

Description of the Related Art

Some apparatuses that discharge liquid, such as a printing apparatus, include a coater that applies a coating liquid such as a treatment liquid to a sheet material as a coating target member.

For example, a printing apparatus is known that includes a coating device. In the printing apparatus, a pair of rolling rollers for conveying a sheet of paper is disposed downstream from the coating device. A circumferential surface of a rotating upper roller of the pair of rolling rollers contacts droplets of the treatment liquid before the droplets of the treatment liquid landed on the sheet completely penetrate into the sheet. Then, droplets of the treatment liquid remaining on the sheet without penetrating into the sheet are sandwiched and pressed between the upper roller and a lower roller of the pair of rolling rollers, so that the droplets remaining on the sheet are thinly stretched on the sheet, and the coating range of the treatment liquid spreads.

SUMMARY

An embodiment of this disclosure provides a coater including a coating device and a rotator. The coating device is configured to apply a coating liquid on a sheet material. The rotator is configured to contact a coated surface of the sheet material to which the coating liquid is applied in the coating device; and the rotator has a plurality of particles on a circumferential surface of the rotator.

Another embodiment of this disclosure provides a liquid discharge apparatus including a coating device, a rotator, and a liquid discharge device.

The coating device is configured to apply a coating liquid to a sheet material. The rotator is configured to contact a coated surface of the sheet material to which the coating liquid is applied with the coating device. The rotator has a plurality of fine particles on a circumferential surface of the rotator. The liquid discharge device is configured to discharge a liquid to the sheet material. The rotator is disposed downstream from the coating device and upstream from the liquid discharge device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
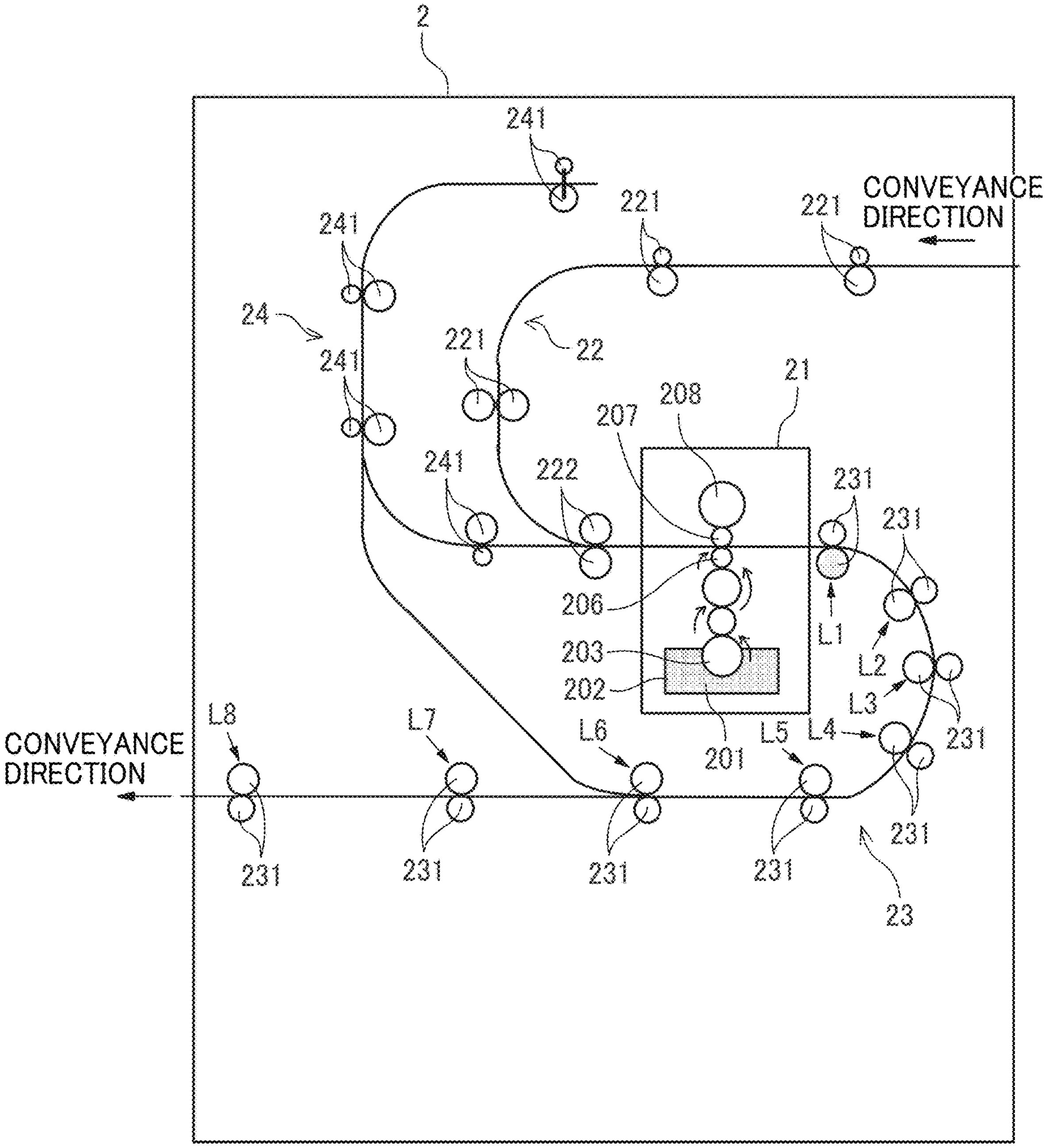
FIG. 1 is a schematic view of a coater according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus according to an embodiment of this disclosure is described. As used herein, the singular forms "a", "an", and "the" are intended to include the plural forms as well, unless the context clearly indicates otherwise.

Figure 2:
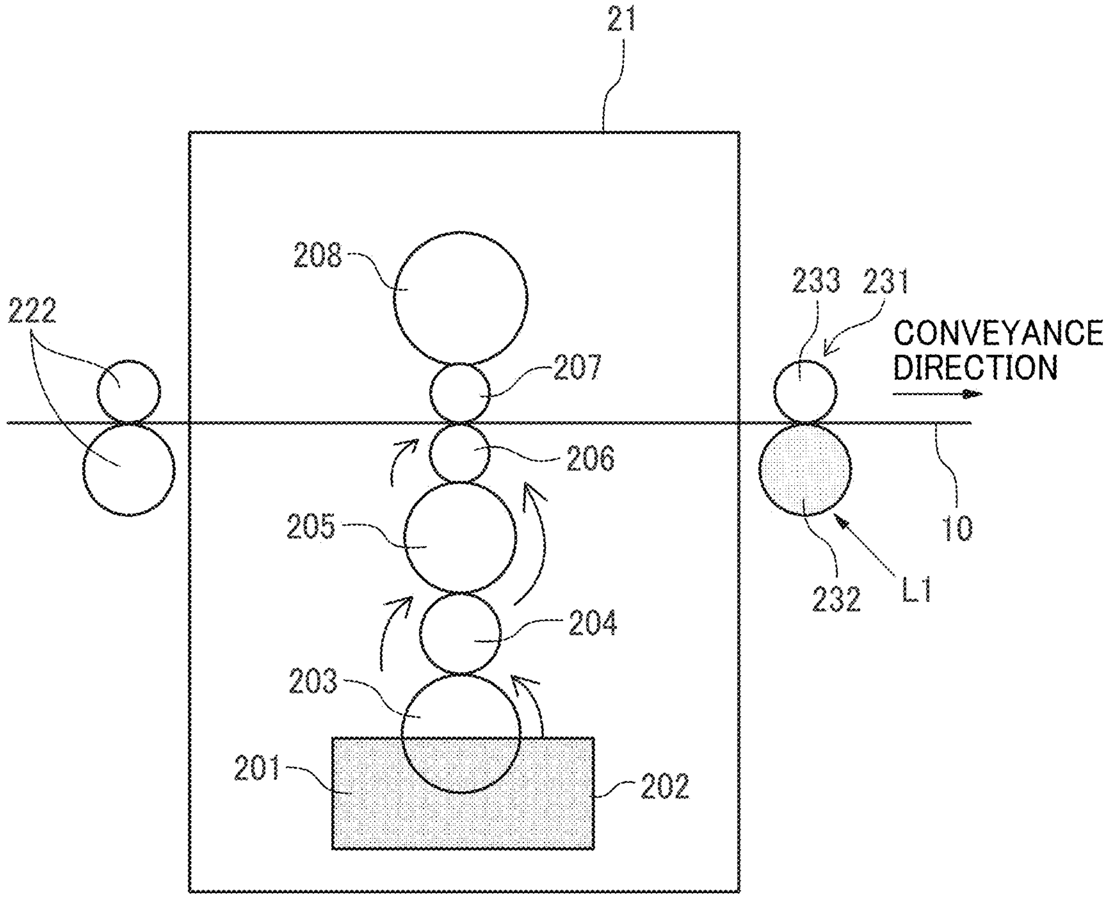
FIG. 2 is a schematic view of a coating device of the coater of FIG. 1.

Hereinafter, embodiments of the present disclosure are described with reference to the attached drawings. First, descriptions are given below of a coater according to the first embodiment of the present disclosure with reference to FIGS. 1 and 2. FIG. 1 is a schematic view of the coater according to the first embodiment of the present disclosure. FIG. 2 is a schematic view of a coating device of the coater of FIG. 1.

A coater 2 according to the first embodiment of the present disclosure includes a coating device 21 that applies a treatment liquid 201 as a coating liquid onto a sheet material 10, an upstream conveyance path 22, a downstream conveyance path 23, a reverse conveyance path 24, and the like.

The upstream conveyance path 22 is a path for conveying the sheet material 10, which is conveyed to the coater 2, toward the coating device 21. Conveyance roller pair rows 221 and 222 are arranged on the upstream conveyance path 22. In each of the conveyance roller pair rows 221 and 222, a plurality of conveyance roller pairs that convey the sheet material 10 is arranged in a direction orthogonal to a direction of the conveyance of the sheet material 10.

The downstream conveyance path 23 is a path that conveys the sheet material 10 to which the treatment liquid 201 is applied in the coating device 21. A plurality of conveyance roller pair rows 231 are arranged on the downstream conveyance path 23.

The reverse conveyance path 24 is a path that first reverses the sheet material 10 after the treatment liquid is applied to one side of the sheet material 10 and then re-conveys the sheet material 10 to the conveyance roller pair row 222 on the upstream conveyance path 22, when the treatment liquid is applied to both sides of the sheet material 10. A plurality of conveyance roller pair rows 241 is arranged on the reverse conveyance path 24.

The coating device 21 includes a treatment liquid container tank (supply pan) 202 that contains the treatment liquid 201, a scooping roller 203 that scoops up the treatment liquid 201, a plurality of intermediate rollers 204 and 205 that performs, for example, film thickness control of the treatment liquid 201 and a coating roller 206 that applies the treatment liquid 201 to the sheet material 10. Further, the coating device 21 includes a pressure roller 207 facing the coating roller 206 and a pressing roller 208 that presses the pressure roller 207.

In the coating device 21, the scooping roller 203 draws up the treatment liquid 201 and the intermediate rollers 204 and 205 perform the film thickness control. The treatment liquid 201 is thus transferred to the coating roller 206 and a liquid film of the treatment liquid 201 having a given thickness is formed on a circumferential surface of the coating roller 206.

As the sheet material 10 is conveyed through the conveyance roller pair rows 221 on the upstream conveyance path 22 and passes through a nip portion between the coating roller 206 and the pressure roller 207, the treatment liquid 201 is applied to the sheet material 10.

The sheet material 10 coated with the treatment liquid 201 is conveyed further downstream via the conveyance roller pair rows 231 of the downstream conveyance path 23 or conveyed to the reverse conveyance path 24. Note that in the present embodiment, of two rollers of the conveyance roller pair row 231 illustrated in FIG. 2, a conveyance roller to contact a surface of the sheet material 10 coated with the treatment liquid 201 serves as a driving roller.

Figure 3:
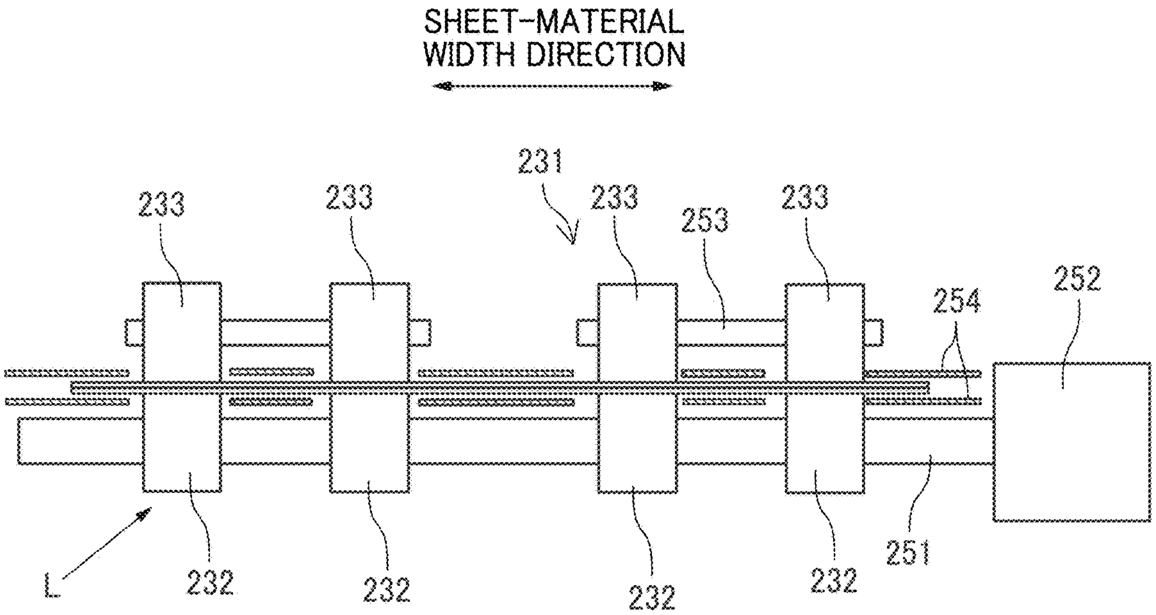
FIG. 3 is a front view of a conveyance roller pair row disposed in a downstream conveyance path of the coater of FIG. 1.

Next, a description is given of an example of the conveyance roller pair rows 231 disposed along the downstream conveyance path 23 of the coater 2, with reference to FIG. 3. FIG. 3 is a front view of the conveyance roller pair row 231.

The conveyance roller pair rows 231 include driving rollers (driving-side conveyance rollers) 232 and driven rollers (driven-side conveyance rollers) 233 facing the driving-side conveyance rollers 232. As illustrated in FIG. 3, the driving-side conveyance rollers 232 are mounted on roller shafts 251 and form a driving roller row L as a plurality of conveyance rotators. Each of the driven rollers (driven-side conveyance rollers) 233 faces the corresponding one of the driving-side conveyance rollers 232. The driving rollers 232 are rotators, and the driving roller row L is a row of rotators.

The roller shaft 251 rotates as the rotation of the drive motor 252 as a driving source is transmitted to the roller shaft 251. Note that in FIG. 3, for the sake of illustration, the drive motor 252 is illustrated as being directly connected to the roller shaft 251, but in the present embodiment, the driving force is transmitted to the roller shaft 251 via a drive transmission mechanism.

The two driven rollers 233 are arranged around the roller shafts 253. Guide plates 254 are disposed between adjacent ones of the driving rollers 232 and between adjacent ones of the driven rollers 233.

In the coater 2 according to the present embodiment, as illustrated in FIG. 1, the conveyance roller pair rows 231 including a plurality of driving roller rows from a first driving roller row L1 to an eighth driving roller row L8 are arranged along the downstream conveyance path 23 of the coating device 21.

Figure 4:
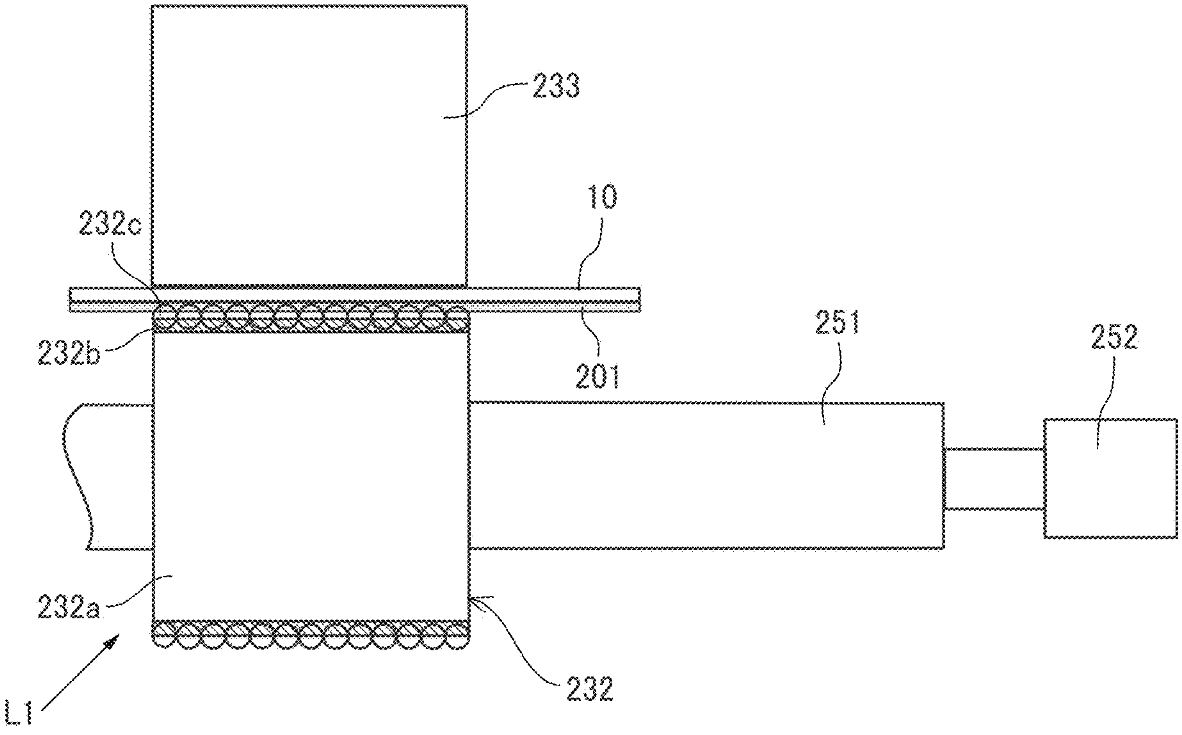
FIG. 4 is a front view of a portion including one driving roller and one driven roller of a first drive roller row.
Figure 5:
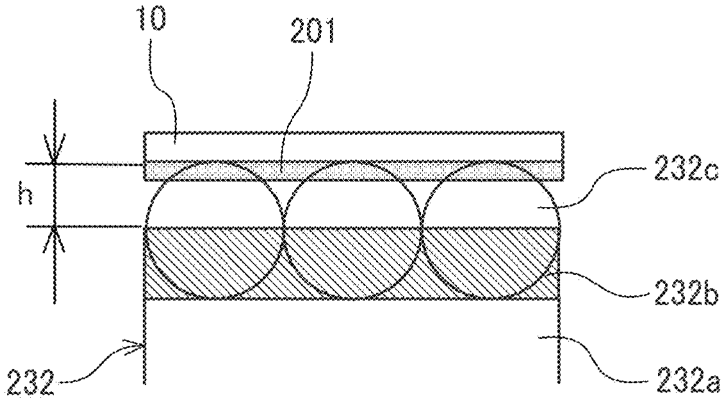
FIG. 5 is an enlarged view of a circumferential surface portion of the driving roller of FIG. 4.

Next, a description is given of driving rollers of the first driving roller row, with reference to FIGS. 4 and 5. FIG. 4 is an enlarged front view of a portion including one driving roller and one driven roller of the first driving roller row. FIG. 5 is an enlarged view of a circumferential surface portion of the driving roller of FIG. 4.

Each of the driving rollers 232 of the first driving roller row L1 has a roller body (rotator body) 232*a* and a plurality of fine particles 232*b* adhered to a circumferential surface (surface) of the roller body 232*a* with an adhesive 232*c*. The roller body 232*a* is fixed to the roller shaft 251.

In the present embodiment, the roller body 232*a* is a rubber roller (a roller having a rubber layer as at least a surface layer) and the plurality of fine particles 232*b* is adhered to a surface of the roller body 232*a*. Spherical glass beads are used as the fine particles 232*b*. In the present embodiment, the driven rollers 233 are resin rollers.

In the present embodiment, the driving rollers 232 of driving roller rows from the second driving roller row L2 to the eighth driving roller row L8 include roller bodies 232*a* only. FIGS. 1 and 2 illustrate, with hatching, one of the driving rollers 232 of the first driving roller row L1 formed of rotators having the fine particles 232*b* on the circumferential surfaces and distinguish the one driving roller 232 of the first drive roller row L1 from driving rollers 232 of the driving roller rows from the second driving roller row L2 to the eighth driving roller row L8 formed of rotators having no fine particles 232*b* on the circumferential surfaces, which is the same as in the embodiments described below.

Thus, each driving roller 232 of the first driving roller row L1 first contacts a coated surface of the sheet material 10 to which the treatment liquid 201 is applied in the coating device 21. Since the driving roller 232 has the plurality of fine particles 232*b* on the circumferential surface, as illustrated in FIG. 5, the drive roller 232 point-contacts the sheet material 10.

Such a configuration reduces the amount at which the treatment liquid 201 is scraped off the coated surface by the driving rollers 232 immediately after the treatment liquid 201 is applied to the sheet material 10. Therefore, unevenness in the coating amount of the treatment liquid 201 between portions contacting the driving rollers 232 and portions not contacting the driving rollers 232 can be reduced.

Here, the particle diameter of the plurality of fine particles 232*b* of the driving roller 232 is larger than an average film thickness of the treatment liquid 201 applied to the sheet material 10. In such a case, to maintain the adhesive force of the adhesive 232*c* and secure the protrusion amount h (see FIG. 5) of the fine particles 232*b* from the adhesive 232*c*, the particle diameter of the fine particles 232*b* is preferably twice or more of the average film thickness of the applied treatment liquid 201.

The average film thickness is defined as follows. D=M/(S×ρ), where D represents the average film thickness, M represents a weight (g) of the treatment liquid 201 applied to the sheet material 10, S represents an area (m2) of the coated surface of the sheet material 10, and ρ (g/m3) represents a density of the treatment liquid 201.

In the present embodiment, the particle size of the plurality of fine particles 232*b* is in the range of 30 μm to 200 μm, and the average film thickness of the coated liquid (treatment liquid 201) is in the range of 0.5 μm to 10 μm. The particle diameter of the plurality of the fine particles 232*b* is preferably within the above-described range, and variations among the plurality of fine particles 232*b* are preferably within ±30%.

Thus, the state of the driving rollers 232 point-contacting the sheet material 10 can reliably be secured.

Figure 6:
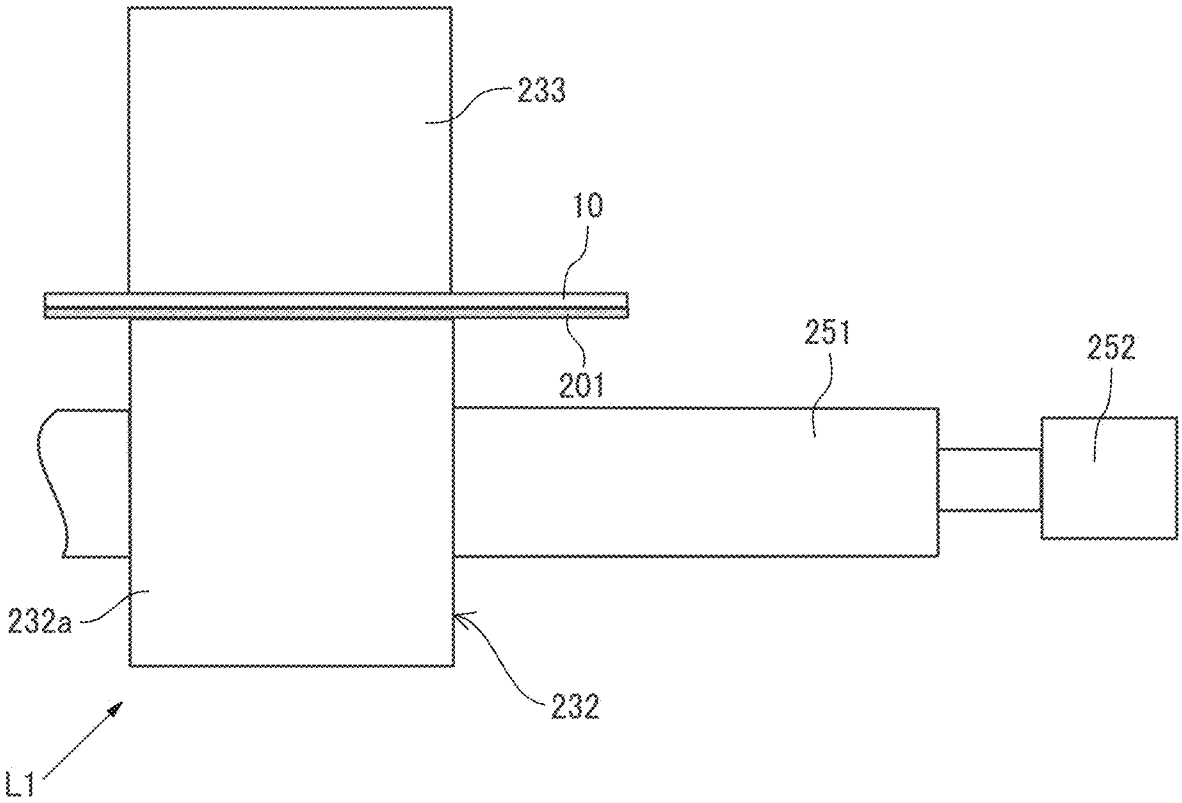
FIG. 6 is a front view of a portion including one driving roller and one driven roller of a first drive roller row of Comparative Example 1.
Figure 7:
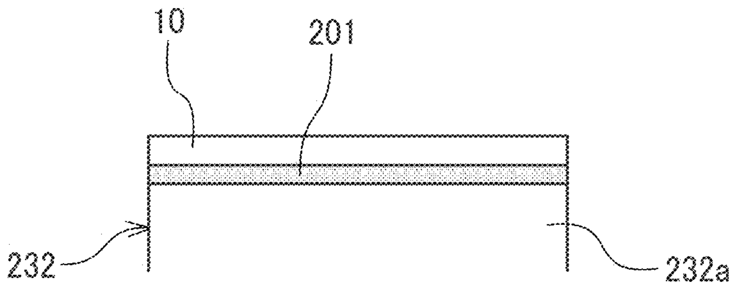
FIG. 7 is an enlarged view of a circumferential surface portion of the drive roller of FIG. 6.

Next, Comparative Example 1 is described with reference to FIGS. 6 and 7. FIG. 6 is an enlarged front view of a portion including one driving roller and one driven roller of a first driving roller row according to Comparative Example 1. FIG. 7 is an enlarged view of a circumferential surface portion of the driving roller of FIG. 6.

In Comparative Example 1, all the driving rollers 232 of driving roller rows from a first driving roller row L1 to an eighth driving roller row L8 are rollers made of rubber (or urethane), corresponding to the roller bodies 232*a* of the present embodiment.

In the configuration of Comparative Example 1, as illustrated in FIG. 7, the driving rollers 232 of the first driving roller row L1 first contact a coated surface of the sheet material 10 to which the treatment liquid 201 is applied in the coating device 21. The driving rollers 232 face-contact the sheet material 10.

Accordingly, the treatment liquid 201 is scraped off in a portion of the sheet material 10 that the driving rollers 232 contact, whereas the treatment liquid 201 is not scraped off in a portion of the sheet material 10 that the driving rollers 232 does not contact. As a result, unevenness in the coated amount of the treatment liquid 201 occurs between the portion of the sheet material 10 that the driving rollers 232 contact and the portion of the sheet material 10 that the driving rollers 232 do not contact.

Figure 8:
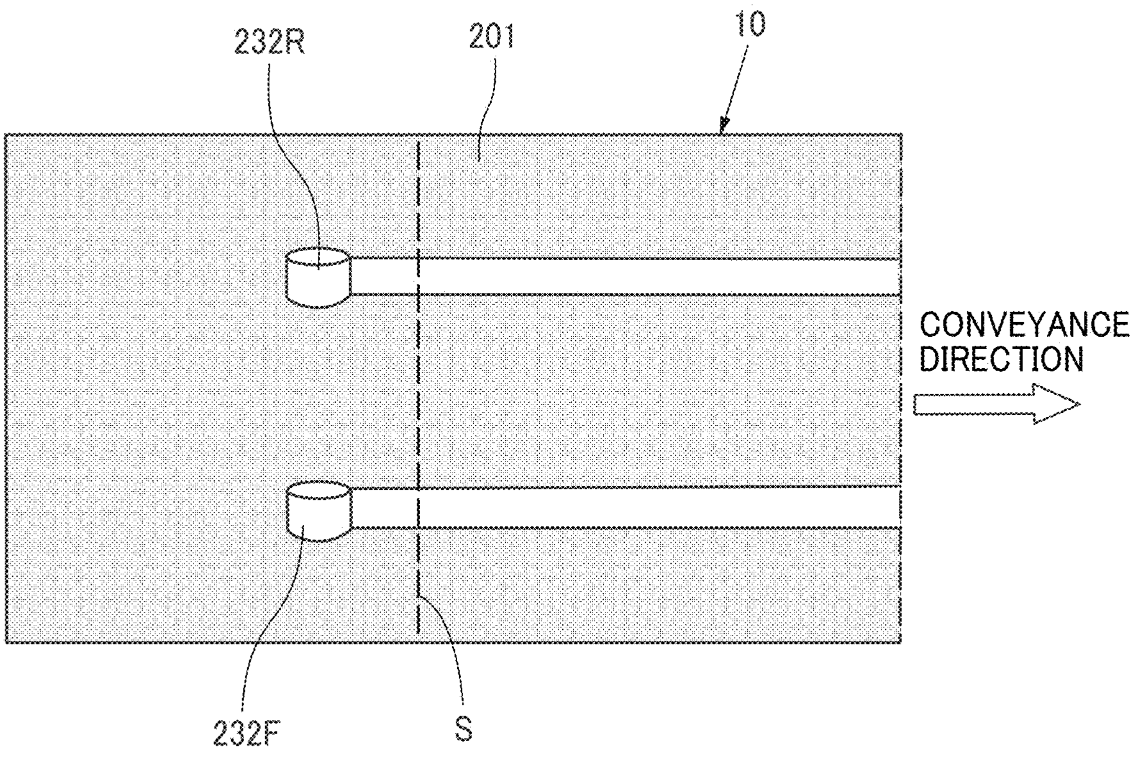
FIG. 8 is an illustration of a method of measuring unevenness of a coating amount.
Figure 9A:
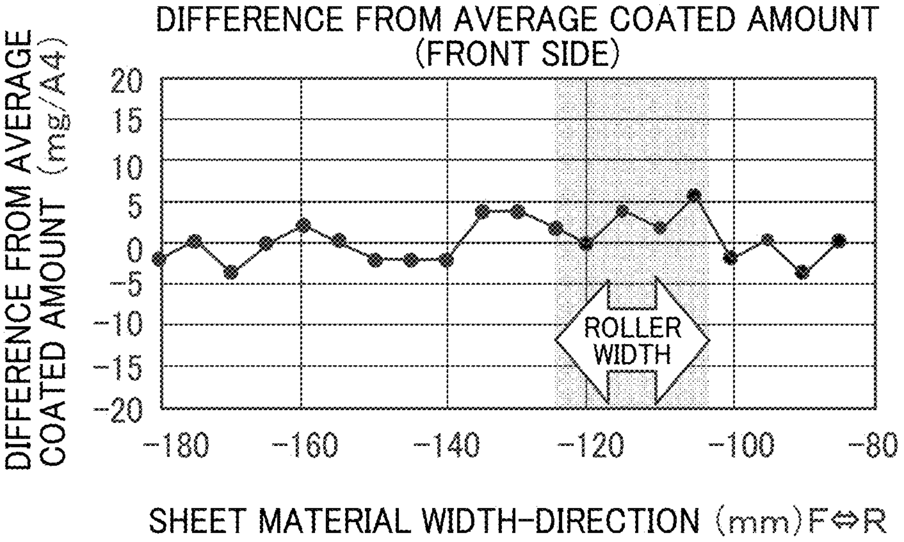
FIGS. 9A and 9B are graphs illustrating measurement results of unevenness of a coating amount on a front side and a rear side in the present embodiment.
Figure 9B:
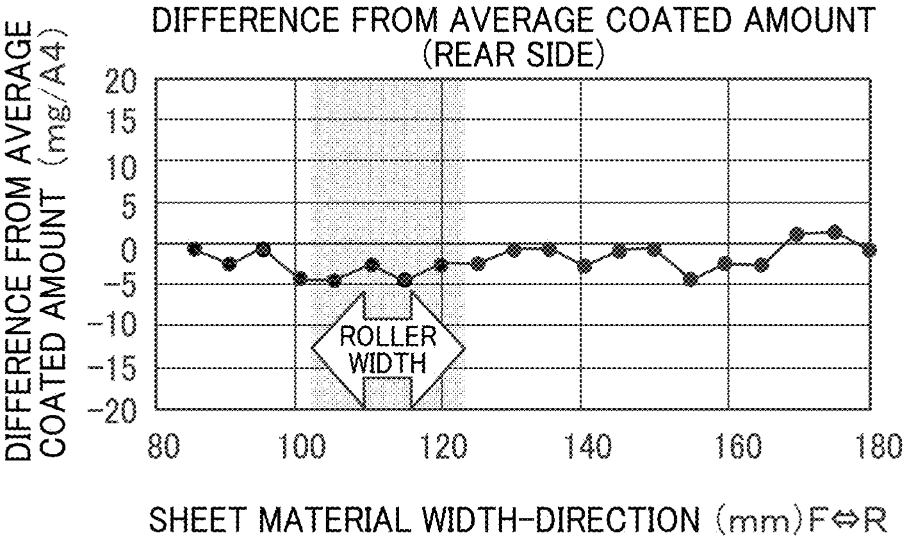
Figure 10A:
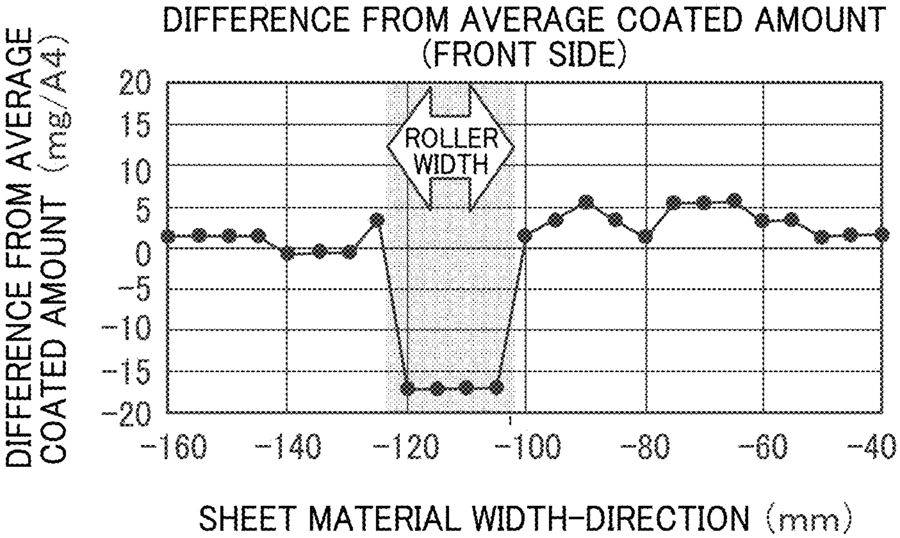
FIGS. 10A and 10B are graphs illustrating measurement results of unevenness of a coating amount on a front side and a rear side in Comparative Example 2.
Figure 10B:
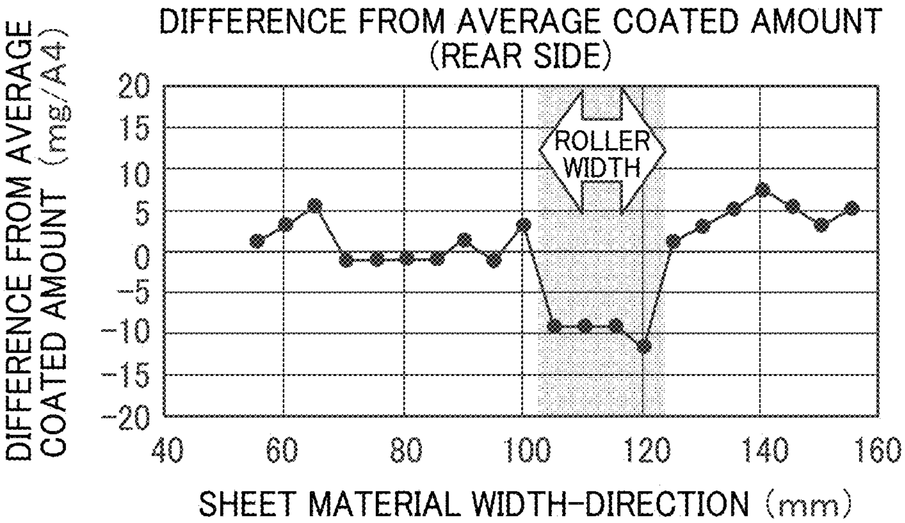

Here, an example of measurement results of the coated amount unevenness in the present embodiment and the coated amount unevenness in Comparative Example 2 using urethane rollers is described with reference to FIGS. 8 to 10A and 10B. FIG. 8 is an illustration of a method for measuring unevenness of coated amount. FIGS. 9A and 9B are graphs of measurement results of unevenness of coated amount on a front side and a rear side in the present embodiment. FIGS. 10A and 10B are graphs of measurement results of unevenness of coated amount on a front side and a rear side in Comparative Example 2.

As illustrated in FIG. 8, the unevenness of the coated amount is measured by arranging a driving roller 232F on a front side and a driving roller 232R on a rear side, contacting the driving roller 232F and the driving roller 232R with a surface of the sheet material 10 coated with the treatment liquid 201, and conveying the sheet material 10.

Coated amounts at positions on a line S in FIG. 8 are measured, and the difference is obtained between an average coated amount in a non-contact area in which the driving rollers 232F and 232R do not contact the sheet material 10 and an average coated amount in a contact area in which the driving rollers 232F and 232R contact the sheet material 10.

In the present embodiment, as illustrated in FIGS. 9A and 9B, the difference is in a range of from about −5 to about +5 (mg/A4). In Comparative Example 2, as illustrated in FIGS. 10A and 10B, the difference is enlarged to a range of from about −20 to +10 (mg/A4). In Comparative Example 2, a larger amount of the applied treatment liquid 201 is scraped off by the driving rollers 232F and 232R, causing the above-described larger difference. Here, the unit of mg/A4 represents the coated amount of the treatment liquid 201 per A4 size of 210 mm×297 mm.

From the measurement results, according to the present embodiment, the amount of the treatment liquid 201 is reduced by the driving rollers 232. Thus, unevenness in the coated amount of the treatment liquid 201 that occurs between portions contacting the driving rollers 232 and portions not contacting the driving rollers 232 can be reduced.

In the present embodiment, the driving rollers (driving-side conveyance rollers) 232 are rotators having fine particles. However, embodiments of the present disclosure are not limited to the configuration.

That is, since the coater 2 of the present embodiment can apply the treatment liquid 201 to both surfaces of the sheet material 10, the driven rollers (driven-side conveyance rollers) 233 also contact the coated surface of the sheet material 10 to which the treatment liquid 201 is applied. Therefore, it is preferable to use rotators having fine particles for the driven rollers 233.

Alternatively, in a configuration in which the treatment liquid 201 is applied to one side of the sheet material 10, the driven rollers 233 contact a coated surface of the sheet material 10 to which the treatment liquid 201 is applied and the driving rollers 232 do not contact the coated surface, rotators having fine particles can be used for the driven rollers 233 (driven-side conveyance rollers).

Such a configuration in which rotators having fine particles are used as driven-side conveyance rollers can similarly apply to the embodiments described below.

Figure 11:
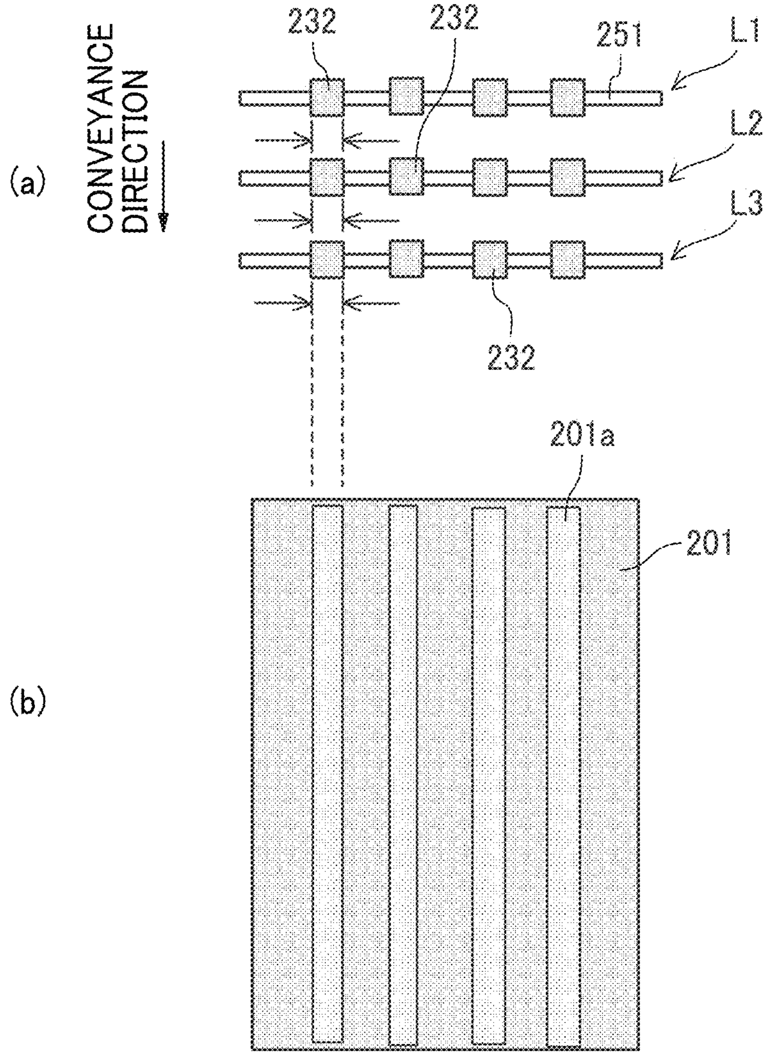
FIG. 11 is an illustration of driving roller rows of the coater according to a second embodiment of the present disclosure.

Next, descriptions are given below of a coater according to a second embodiment of the present disclosure with reference to FIG. 11. FIG. 11 is an illustration of driving roller rows of the coater according to the second embodiment of the present disclosure.

In the present embodiment, as indicated by hatching in part (a) of FIG. 11 of the above-described first embodiment, the driving rollers 232 of driving roller rows from the first driving roller row L1 to the third driving roller row L3 that follow the coating device 21 are rotators having the fine particles 232*b* on the circumferential surfaces.

As described above, the plurality of driving roller rows L is arranged as the plurality of rotator rows following the coating device 21 in the direction of conveyance of the sheet material 10. The driving rollers 232 of the plurality of driving roller rows L are rotators having the fine particles 232*b*.

Such a configuration can more reduce unevenness in the coated amount of the treatment liquid 201 between portions contacting the driving rollers 232 and portions not contacting the driving rollers 232 than a case in which only the driving rollers 232 of the first driving roller row L1 are rotators having the fine particles 232*b*.

However, in the present embodiment, the driving rollers 232 of the driving roller rows L1 to L3 are arranged at four positions with in the direction (the width direction of the sheet material 10) orthogonal to the direction of conveyance so as to form four rows aligned in the direction of conveyance of the sheet material 10. Accordingly, as illustrated in part (b) of FIG. 1, driving rollers 232 aligned in the direction of conveyance among the driving roller rows L1 to L3 contact substantially the same region (a contact region 201*a*) on the sheet material 10, and the treatment liquid 201 may be slightly reduced in the contact region 201*a*.

Figure 12:
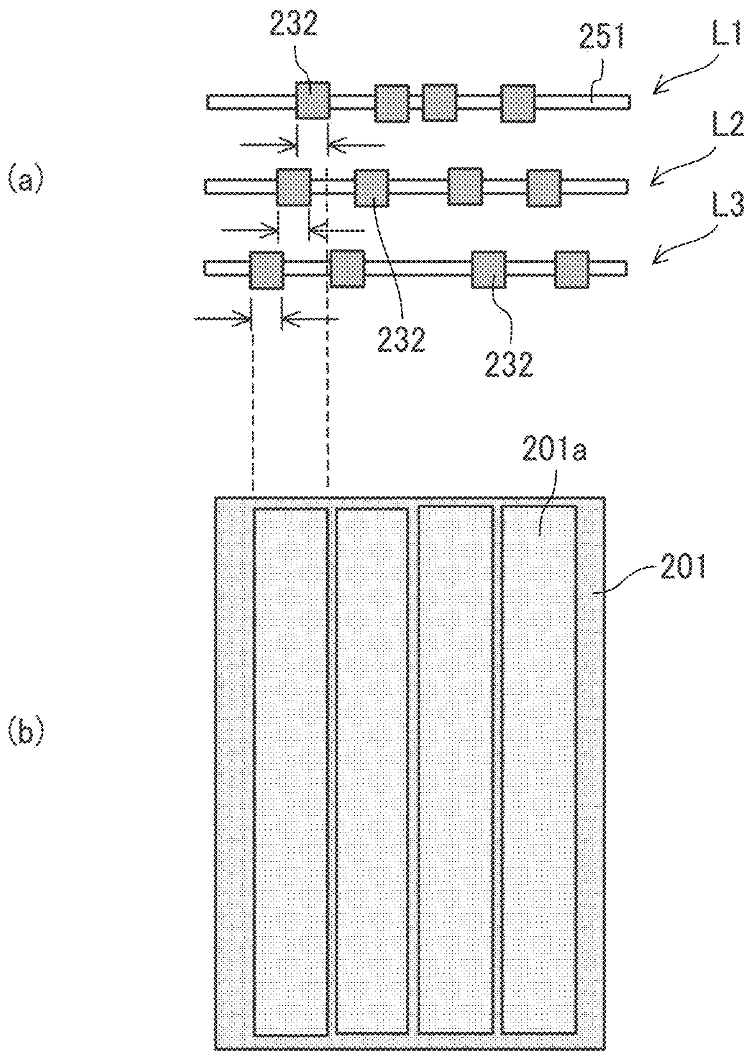
FIG. 12 is an illustration of driving roller rows of the coater according to a third embodiment of the present disclosure.

Next, descriptions are given below of the coater according to a third embodiment of the present disclosure with reference to FIG. 12. FIG. 12 is an illustration of driving roller rows of the coater according to the third embodiment of the present disclosure with reference to FIG. 12.

In the present embodiment, as illustrated in part (a) of FIG. 12, the driving rollers 232 of drive roller rows from the first drive roller row L1 to the third drive roller row L3 are disposed at different positions among the driving roller rows in the direction (width direction of the sheet material 10) orthogonal to the direction of conveyance of the sheet material 10.

With such a configuration, as illustrated in part (b) of FIG. 12, the driving rollers 232 of the driving roller rows from the first driving roller row L1 to the third driving roller row L3 contact different regions on the sheet material 10, thus more reducing the scraped amount of the treatment liquid 201 in the contact region 201*a* than in the above-described second embodiment.

In the above-described second and third embodiment, the rotators having fine particles on the circumferential surfaces are used for the driving rollers 232 of three driving roller rows L (L1 to L3) that follows a coating device (coating device 21) in the conveyance path. However, embodiments of the present disclosure are not limited to the above-described configuration.

For example, a configuration may be employed in which rotators having fine particles on the circumferential surfaces are used for the driving rollers 232 of two driving roller rows L (L1 and L2) that follows the coating device (coating device 21) in the conveyance path. Alternatively, a configuration may be employed in which rotators having fine particles on the circumferential surfaces are used for the driving rollers 232 of not less than four rows or all driving roller rows L (L1 to L8).

Figure 13:
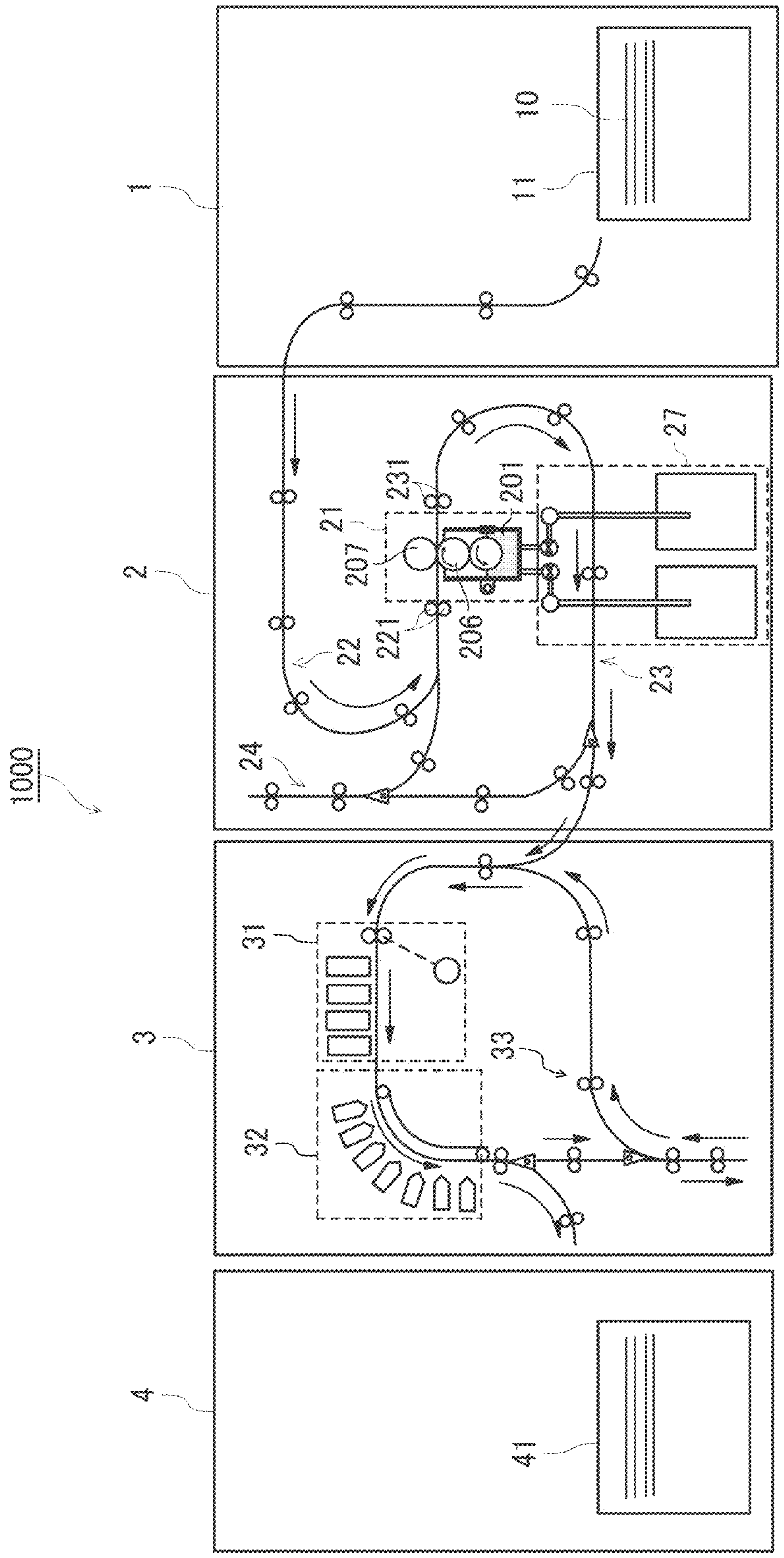
FIG. 13 is a schematic view of a printing apparatus as a liquid discharge apparatus, according to a fourth embodiment of the present disclosure.

Next, descriptions are given below of a printing apparatus 1000 as a liquid discharge apparatus according to a fourth embodiment of the present disclosure with reference to FIG. 13. FIG. 13 is a schematic view of the printing apparatus.

The printing apparatus 1000 as an apparatus for discharging liquid includes a feeder 1 to feed the sheet material 10, a coater 2 as a coater according to the present disclosure as a pretreatment device to apply a treatment liquid to the sheet material 10, a printer 3 to print on the sheet material 10 to which the treatment liquid is applied and a sheet stocker 4 to which the sheet material 10 is ejected.

The feeder 1 includes a container 11 to store the sheet material 10 and feeds the sheet material 10 to the coater 2.

The coater 2 includes the coating device 21. The coating device 21 coats a print surface of the sheet material 10 with a treatment liquid that has a functional effect to agglomerate the treatment liquid as a coating liquid, such as ink, and prevent bleeding of the treatment liquid onto a back side of the sheet material 10.

The printer 3 includes a liquid application device (liquid discharge device) 31 and a drying device 32. The liquid application device 31 discharges ink onto the sheet material 10, to which the treatment liquid 201 is applied in the coater 2, to print such as a desired image on the sheet material 10. The drying device 32 dries ink applied to the sheet material 10.

Note that the printer 3 includes a reverse conveyance path 33 that reverses the sheet material 10 conveyed from the drying device 32 when printing on front and back sides of the sheet material 10. With such a configuration, ink is discharged onto a reverse side of a pre-printed side of the sheet material 10 for printing, and the newly printed reverse side is dried in the drying device 32, and the sheet material 10 is ejected to the sheet stocker 4.

The sheet stocker 4 includes a sheet container 41 that stores the sheet material 10 ejected from the printer 3.

Figure 14:
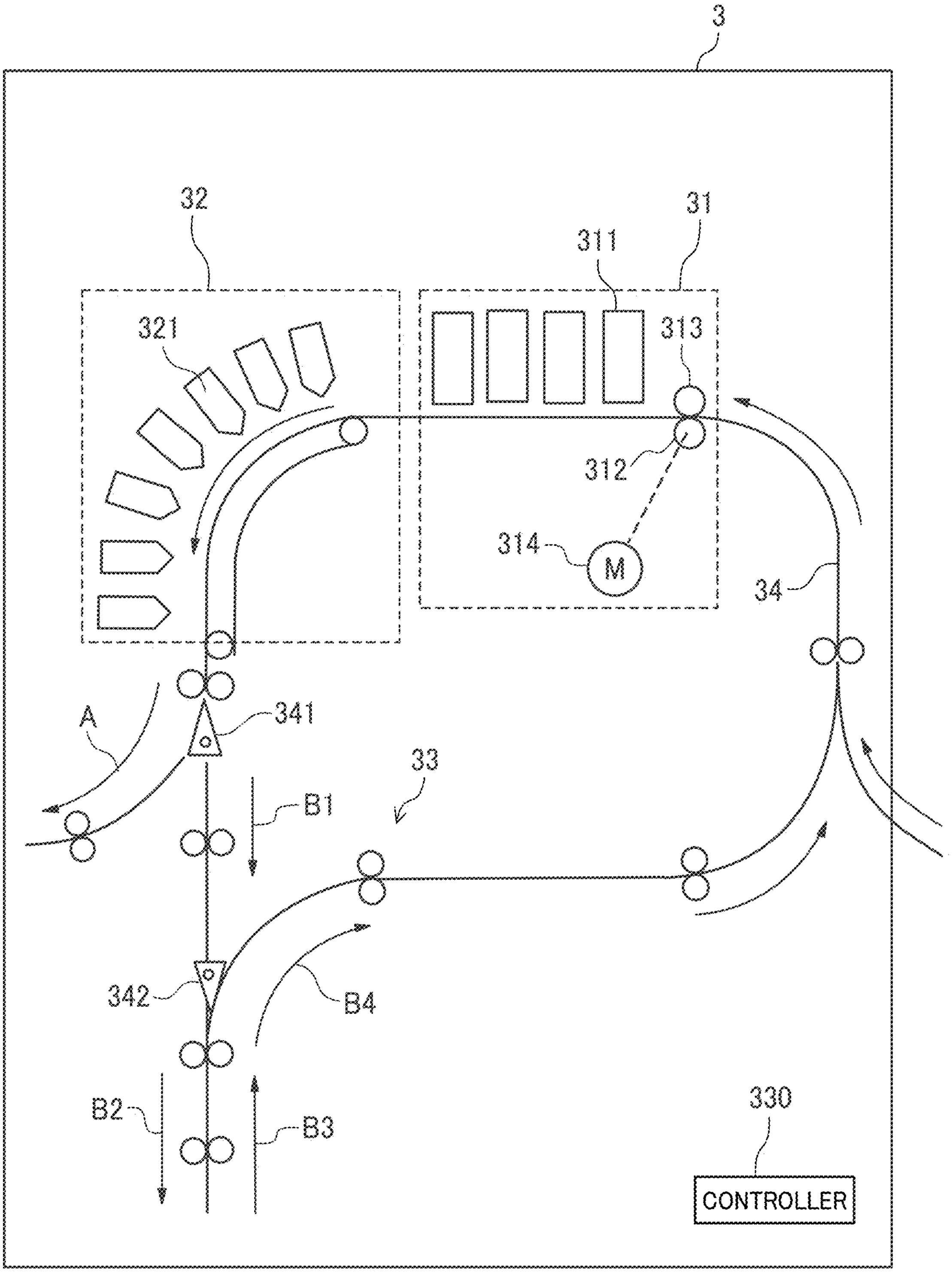
FIG. 14 is a schematic view of a printer.

Next, descriptions are given of the printer 3 with reference to FIG. 14. FIG. 14 is a schematic view of the printer 3.

The printer 3 includes the liquid application device 31, the drying device 32, and the conveyance path 34 including the reverse conveyance path 33.

The liquid application device 31 includes liquid, such as ink, discharge heads 311 as a plurality of liquid discharge devices that discharge liquid to the sheet material 10 conveyed to the liquid application device 31, a driving roller 312 and a driven roller 313 that convey the sheet material 10 and a drive motor 314 that rotates the driving roller 312. In the present embodiment, a plurality of liquid discharge heads 311 each discharge, for example, liquid of each color of black (K), cyan (C), magenta (M), and yellow (Y). The number of the liquid discharge heads 311 and the liquid color discharged are not limited to the above-described number and liquid color.

The drying device 32 includes a plurality of non-contact heaters 321 that dries liquid attached to the sheet material 10 conveyed. As the non-contact heater 321, for example, an infrared heater is used. Alternatively, other heaters such as a hot air blower can also be used. In the drying device 32, a contact heater such as a heating roller, or an airflow blower that blows an airflow of an ambient temperature can be used.

The conveyance path 34 includes the reverse conveyance path 33 and includes a plurality of conveyance rollers and a plurality of conveyance guides. The conveyance path 34 includes a third branch gate 341 and a fourth branch gate 342 that switch the direction of conveyance of the sheet material 10.

The printer 3 discharges ink from the liquid discharge heads 311 to the sheet material 10 to print a desired image while conveying the sheet material 10 to which the treatment liquid is applied in the coater 2. The drying device 32 dries liquid (ink, and treatment liquid) applied to the sheet material 10.

Here, in case of single-sided printing, the third branch gate 341 is switched to a sheet stocker 4 side, and the sheet material 10 passing through the drying device 32 is conveyed in a direction indicated by arrow A and ejected to the sheet stocker 4.

Further, in case of double-sided printing, the third branch gate 341 is switched to a reverse conveyance path 33 side by a controller 330, and the sheet material 10 passing through the drying device 32 is conveyed in a direction indicated by arrow B1 to the reverse conveyance path 33.

After the sheet material 10 passes through the fourth branch gate 342 and is conveyed in a direction indicated by arrow B2 in the reverse conveyance path 33, the controller 330 switches the fourth branch gate 342, to convey the sheet material 10 in reverse in a direction indicated by arrow B3. Thus, the sheet material 10 is conveyed in a direction indicated by arrow B4.

With such a configuration, the sheet material 10 of which one side is printed is again conveyed to the liquid application device 31. After the other side is printed and dried in the drying device 32, the sheet material 10 is ejected to the sheet stocker 4.

Figure 15:
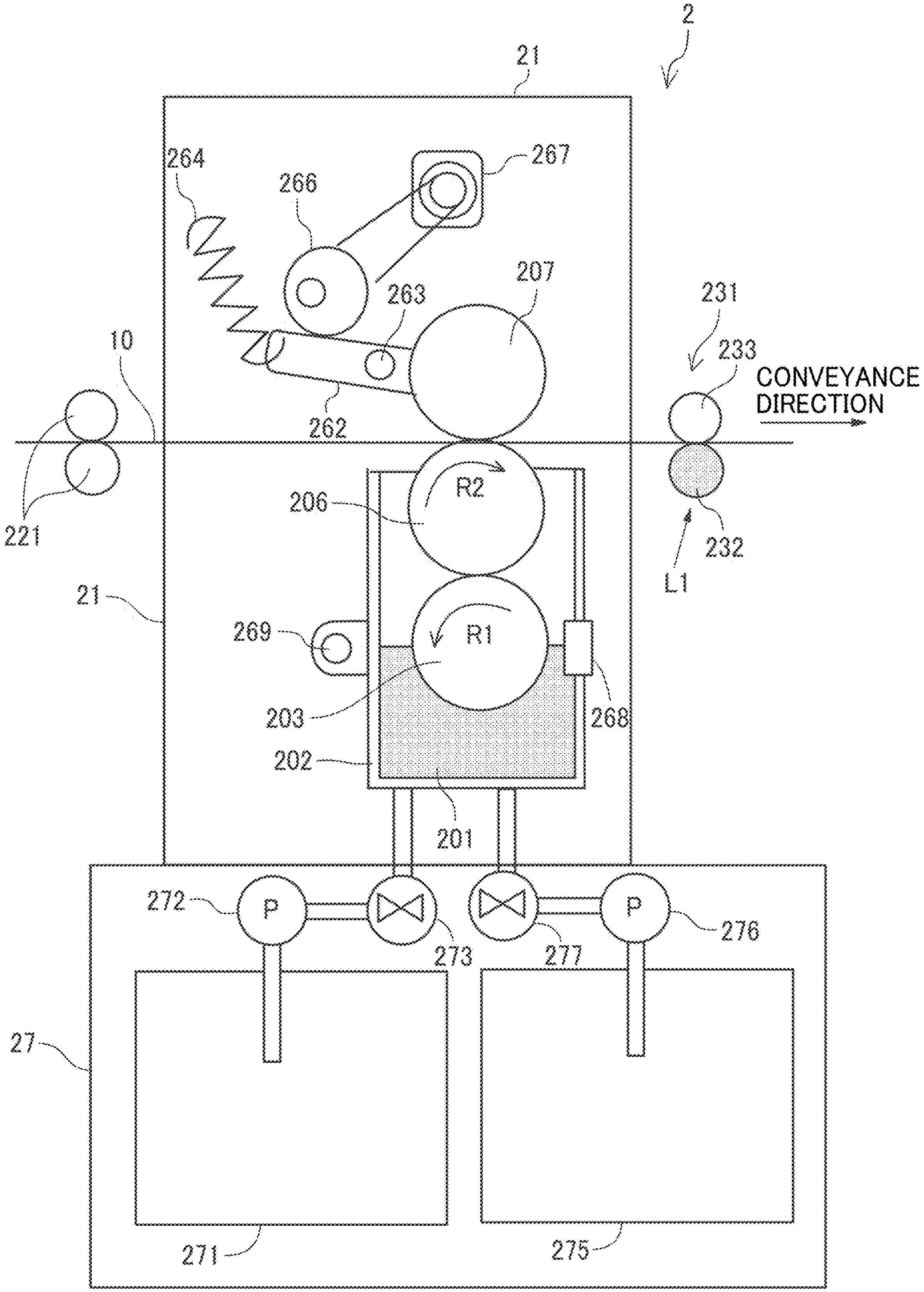
FIG. 15 is an illustration of a main part of the coater as a pretreatment device.

Next, descriptions are given below of the coater as the pretreatment device with reference to FIG. 15. FIG. 15 is an illustration of a main part of the coater.

The coater 2 according to the present embodiment includes a coating device 21 that coats the treatment liquid 201 on the sheet material 10, a supply device 27 that supplies the coating device 21 with the treatment liquid 201, an upstream conveyance path 22, a downstream conveyance path 23, and the reverse conveyance path 24, as illustrated in FIG. 13.

An example of the treatment liquid 201 is a modifier that is applied to the surface of the sheet material 10 to modify a surface of the sheet material 10. Specifically, one example of the modifier is a fixing agent (setting agent). The fixing agent is preliminarily applied uniformly onto the sheet material 10 to promptly permeate the moisture of ink into the sheet material 10, thicken a color component, and also speed up drying. Thus, the fixing agent can prevent bleeding (or feathering) or strike-through and increase productivity (the number of images output per unit time).

Compositionally, for the treatment liquid 201, for example, a solution can be used in which cellulose (for example, hydroxypropyl cellulose) that promotes permeation of moisture and a base material, such as talc fine powder, are added to surfactant (for example, any one of anionic, cationic, and nonionic surfactants, or a mixture of two or more of the foregoing surfactants). The treatment liquid 201 may also contain fine particles.

The coating device 21 according to the present embodiment includes a treatment liquid container tank 202 that contains the treatment liquid 201, a scooping roller 203, a coating roller 206, and a pressure roller 207.

The pressure roller 207 is rotatably supported by a support shaft 263 at one end portion of an arm 262 rotatably held by the support shaft 263. A tension coil spring 264 is interposed between the other end portion of the arm 262 and a fixed part such as a wall portion of the coating device 21, and biases the pressure roller 207 via the arm 262 in a direction of pressing the coating roller 206.

Note that the coating device 21 includes a cam 266 that rotates the arm 262 and a drive motor 267 that rotates the cam 266. Rotating the cam 266 allows the pressure roller 207 to be separated from the coating roller 206 via the arm 262.

The scooping roller 203 is partially immersed in the treatment liquid 201 stored in the treatment liquid container tank 202 and rotates in a direction indicated by arrow R1 so that a liquid layer of the treatment liquid 201 is borne on a circumferential surface of the scooping roller 203 and transferred to the coating roller 206. The scooping roller 203 is supported by the treatment liquid container tank 202 that is swingably held by the support shaft 269.

The coating roller 206 coats the treatment liquid 201 transferred from the scooping roller 203 onto the sheet material 10 in a nip portion between the coating roller 206 and the pressure roller 207.

In other words, as the scooping roller 203 rotates in the direction indicated by arrow R1, the treatment liquid 201 stored in the treatment liquid container tank 202 is scooped up by the scooping roller 203. The scooped treatment liquid 201 is conveyed to a contact position (nip) between the coating roller 206 and the scooping roller 203.

The treatment liquid 201 passes through the contact position between the scooping roller 203 and the coating roller 206, and a predetermined amount of the treatment liquid 201 is transferred to the coating roller 206. The transferred treatment liquid 201 is then adhered to an outer circumferential surface of the coating roller 206 to form a thin layer with a predetermined film thickness.

The treatment liquid 201 that is made into a thin layer by rotation of the coating roller 206 in a direction indicated by arrow R2 (illustrated in FIG. 15) is conveyed to the nip portion between the coating roller 206 and the pressure roller 207. The treatment liquid 201 on the surface of the coating roller 206 is transferred and applied to the sheet material 10.

The supply device 27 includes a treatment liquid tank 271 that contains the treatment liquid 201, a supply pump 272, a valve 273, a waste liquid tank 275, a waste liquid pump 276, and a valve 277.

When a level sensor 268 provided in the treatment liquid container tank 202 detects that a level of the treatment liquid 201 is low, the valve 273 is opened and the supply pump 272 is driven. The treatment liquid 201 is conveyed from the treatment liquid tank 271 to the treatment liquid container tank 202.

When the level of the treatment liquid 201 reaches a desired level, the valve 273 closes and the supply pump 272 stops. The level of the treatment liquid 201 in the treatment liquid container tank 202 is kept constant.

For example, if a quality defect is caused by thickening of the treatment liquid 201, the valve 277 is opened and the waste liquid pump 276 is driven to drain the treatment liquid 201 in the treatment liquid container tank 202 into the waste liquid tank 275.

In the coater 2, similarly as described in the above-described embodiment, the driving rollers 232 of the first drive roller row L1 of the conveyance roller pair rows 231 that follow the coating device 21 are rotators having the fine particles 232*b* on the circumferential surfaces.

As described above, the printing apparatus 1000 according to the present embodiment includes the coating device 21, the driving rollers 232, and the liquid application device 31. The coating device 21 applies the treatment liquid 201 as a coating liquid and a pre-coating liquid onto the sheet material 10. The driving rollers 232 are rotators of the first drive roller row (rotator row) L1 that contacts a coated surface of the sheet material 10 on which the treatment liquid 201 is applied in the coating device 21. The liquid application device 31 discharges and applies liquid to the sheet material 10.

The driving rollers 232 of the first drive roller row L1 are rotators having the fine particles 232*b* on the circumferential surfaces. The driving rollers 232 of the first drive roller row L1 that are rotators having a plurality of fine particles on the circumferential surfaces are disposed downstream from the coating device 21 and upstream from the liquid application device 31 (liquid discharge heads 311).

Such a configuration can increase the print quality of the printer 3. That is, if the pre-coating liquid (treatment liquid 201) on the sheet material 10 is scraped off with a roller before printing is performed with ink after coating the pre-coating liquid, the pre-coating liquid disappears or decreases in such a scraped portion. Accordingly, the desired effect of the pre-coating liquid is not be obtained.

In such a case, print density or color tone may change depending on where the pre-coating liquid is scraped off or not. Or, there may occur an area in which the pre-coating liquid is scraped off and an image bleeds and another area in which the pre-coating liquid remains and the image does not bleed.

As a result, streaked image unevenness is perceived on the ejected sheet material 10.

Therefore, in the present embodiment, the driving rollers 232 of the first drive roller row L1 that are rotators having fine particles on the circumferential surfaces are disposed downstream from the coating device 21 and upstream from the liquid application device 31 (liquid discharge heads 311). Thus, streaked image unevenness can be prevented.

Further, a plurality of conveyance roller pairs contacts a coated surface of a sheet material on the conveyance path from the coating device to the liquid discharge device. Fine particles are provided on the surfaces of only conveyance rollers following the coating device or on the surfaces of conveyance rollers of a series of conveyance rollers groups following the coating device, thus preventing occurrence of streaked image unevenness. Note that providing fine particles on the surfaces of all the conveyance rollers from the coating device to the liquid discharge device can more reliably prevent occurrence of streaked image unevenness.

In the above descriptions, the term "printing" in the present disclosure may be used synonymously with, e.g. the terms of "image formation", "recording", "printing", and "image printing". Further, the coater according to an embodiment of the present disclosure can also be applied to an apparatus that performs printing on an electrophotographic process on a sheet material coated with a coating liquid.

The suffixes Y, M, C, and K attached to each reference numeral indicate only that components indicated thereby are used for forming yellow, magenta, cyan, and black images, respectively, and hereinafter may be omitted when color discrimination is not necessary.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A coater comprising:

a coating device having a scooping roller, a coating roller, a pressure roller, and at least one intermediate roller between the scooping roller and the coating roller, within the coating device, the coating device being configured to apply a coating liquid on a sheet material;

a plurality of rotator pairs downstream of the coating device in a conveyance direction and configured to contact a coated surface of the sheet material to which the coating liquid is applied in the coating device, at least one rotator of each of the plurality of rotator pairs having a plurality of fine glass particles on a circumferential surface of the at least one rotator; and a plurality of rotator rows in each of which a plurality of rotators are arranged in a direction orthogonal to a direction of conveyance of the sheet material, wherein the plurality of rotator rows includes at least three rotator rows with rotators disposed at different positions between the at least three rotator rows in the direction orthogonal to the direction of conveyance of the sheet material such that respective roller pairs among the at least three rotator rows are offset from one another, wherein the rotators of the plurality rotator rows from a first rotator row to a third rotator row contact different regions on the sheet material, and wherein at least one rotator of the plurality of rotator rows has a plurality of fine glass particles on a circumferential surface of the rotator.

2. The coater according to claim 1, wherein the plurality of fine glass particles is adhered to a surface of a rubber layer of the rotator.

3. The coater according to claim 1, wherein the rotator is a conveyance rotator configured to convey the sheet material.

4. The coater according to claim 1, wherein a particle diameter of each of the plurality of fine glass particles is larger than an average film thickness of the coating liquid applied to the sheet material.

5. The coater according to claim 4, wherein the particle diameter of each of the plurality of fine glass particles is twice or more of the average film thickness of the coating liquid applied to the sheet material.

6. The coater according to claim 4, wherein the particle diameter of each of the plurality of fine glass particles is in a range of 30 μm to 200 μm, and wherein the average film thickness of the coated liquid is in a range of 0.5 μm to 10 μm.

7. The coating device according to claim 1, wherein the plurality of rotator pairs includes a driven roller having a plurality of fine glass particles on a circumferential surface.

8. A liquid discharge apparatus comprising:

a coating device having a scooping roller, a coating roller, a pressure roller, and at least one intermediate roller between the scooping roller and the coating roller, within the coating device, the coating device being configured to apply a coating liquid to a sheet material;

a plurality of rotator pairs downstream of the coating device in a conveyance direction and configured to contact a coated surface of the sheet material to which the coating liquid is applied with the coating device;

a liquid discharge device configured to discharge a liquid to the sheet material;

at least one rotator of each of the plurality of rotator pairs having a plurality of fine glass particles on a circumferential surface of the at least one rotator, and the plurality of rotator pairs disposed downstream from the coating device and upstream from the liquid discharge device; and a plurality of rotator rows, downstream in a conveyance direction from the coating device in the conveyance direction, in each of which plurality of rotators including the rotator is arranged in a direction orthogonal to a direction of conveyance of the sheet material, wherein the plurality of rotator rows includes at least three rotator rows with rotators disposed at different positions between the at least three rotator rows in the direction orthogonal to the direction of conveyance of the sheet material such that respective roller pairs among the at least three rotator rows are offset from one another, wherein the rotators of the plurality rotator rows from a first rotator row to a third rotator row contact different regions on the sheet material, and wherein at least one rotator of the plurality of rotator rows has a plurality of fine glass particles on a circumferential surface of the rotator.

9. The liquid discharge apparatus according to claim 8, wherein the plurality of fine glass particles is adhered to a surface of a rubber layer of the rotator.

10. The liquid discharge apparatus according to claim 8, wherein the rotator is a conveyance rotator configured to convey the sheet material.

11. The liquid discharge apparatus according to claim 10, wherein a particle diameter of each of the plurality of fine glass particles is larger than an average film thickness of the coated liquid applied to the sheet material.

12. The liquid discharge apparatus according to claim 11, wherein the particle diameter of each of the plurality of fine glass particles is twice or more of the average film thickness of the coating liquid applied to the sheet material.

13. The liquid discharge apparatus according to claim 11, wherein the particle diameter of each of the plurality of fine glass particles is in a range of 30 μm to 200 μm, and wherein the average film thickness of the coated liquid is in a range of 0.5 μm to 10 μm.

14. The liquid discharge apparatus according to claim 8, wherein the liquid discharge device discharges ink onto the sheet material to print an image on the sheet material.

15. The coating device according to claim 8, wherein the plurality of rotator pairs includes a driven roller having a plurality of fine glass particles on a circumferential surface.

* * * * *